Jan. 30, 1968  R. G. COULSON ETAL  3,365,738
SHOE MANUFACTURE
Filed Nov. 2, 1965
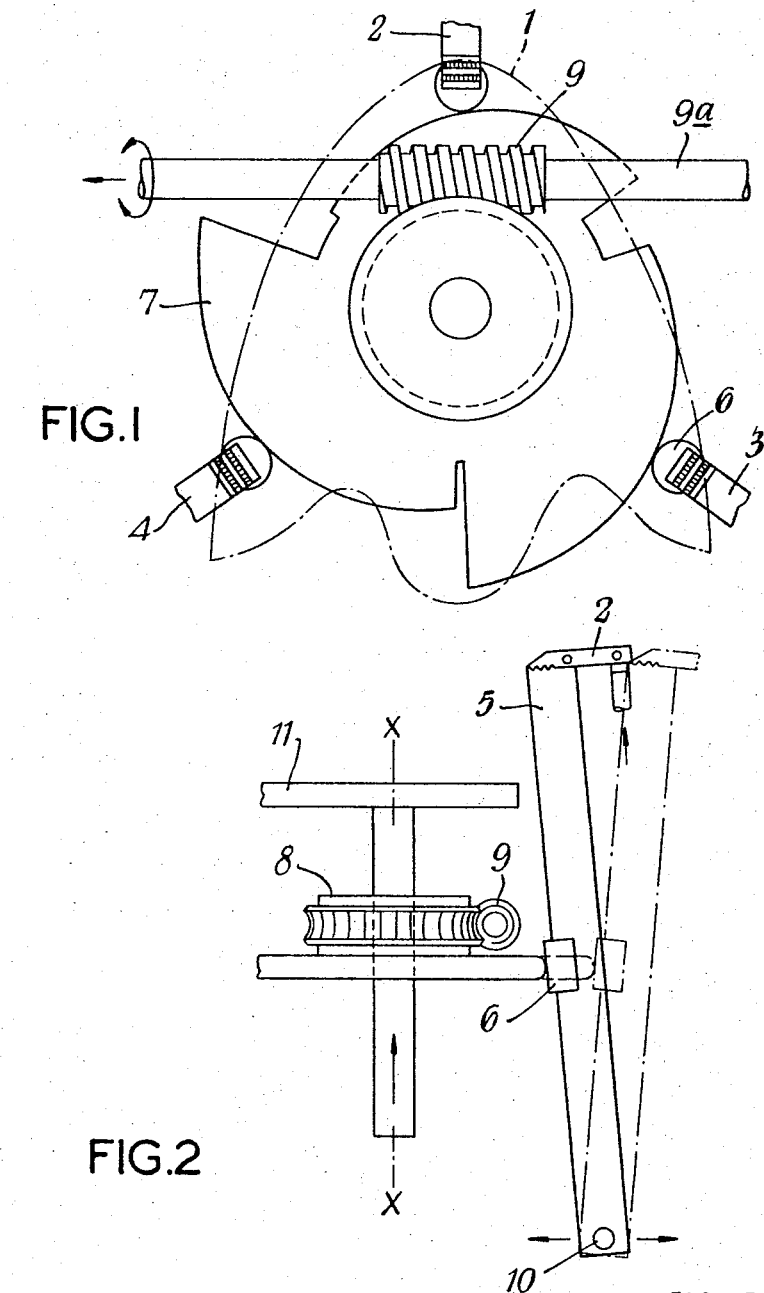
INVENTORS
Ronald Geoffrey Coulson
Alfred Alexander Staden
BY Johnson and Kline
ATTORNEYS

United States Patent Office 3,365,738
Patented Jan. 30, 1968

3,365,738
SHOE MANUFACTURE
Ronald Goeffrey Coulson, Kettering, and Alfred Alexander Staden, Croyland Park, Wellingborough, England, assignors to Shoe and Allied Trades Research Association
Filed Nov. 2, 1965, Ser. No. 506,056
Claims priority, application Great Britain, Nov. 2, 1964, 44,659/64
6 Claims. (Cl. 12—146)

ABSTRACT OF THE DISCLOSURE

An apparatus for stretching a shoe upper forepart in which a plurality of grippers, usually one located at the toe and each waist apex of the forepart, are mounted on individual levers each having a cam follower which coacts with a common cam plate, so that rotation of the cam shaft pushes the grippers apart and stretches the forepart. The cam shaft also carries a mould, the mould being axially displaced along the direction of the cam shaft when the forepart is in stretched condition, so as to deform into a shape more suitable for subsequent lasting.

---

The invention relates to the stretching of shoe upper foreparts.

In patent application Ser. No. 362,365, filed May 24, 1964, now Patent No. 3,315,289, granted Apr. 25, 1967 and in patent application Ser. No. 430,327, filed Feb. 4, 1965, now Patent No. 3,309,725, granted Mar. 21, 1967, there is disclosed and claimed a method of preparing shoe upper foreparts for lasting, which comprises selectively stretching the forepart along regions adjacent and generally parallel to its lateral margins, and setting the stretch in the forepart material, together with apparatus for pre-forming a leather forepart comprising spaced clamps for gripping the leather at spaced positions, means for moving the closed clamps to increase the separation therebetween and means for applying heat and/or moisture to the leather stretched between the clamps.

An object of the present invention is to provide an advantageous form of apparatus for stretching a shoe upper forepart or vamp, the apparatus having clamps movable to increase the spacing therebetween to impart the stretching to the vamp.

It is a further object of the invention to provide apparatus for stretching a shoe upper forepart or vamp which is readily adjustable to vamps of different size or shape.

Another object of the invention is to provide apparatus for stretching a shoe upper forepart or vamp having a plurality of clamps movable by a single cam element to increase the spacing therebetween to thereby effect the stretching of the vamp.

An additional object of the invention is to provide apparatus for pre-forming a shoe upper forepart or vamp having a single cam means operable to increase the spacing between clamping means for the vamp to stretch the vamp and a mould movable to engage and deform the vamp being stretched.

A further object of the invention is to provide a method for pre-forming a shoe upper forepart or vamp in which the spacing between means gripping the edges of the vamp are moved apart as a mould engages the vamp.

The invention accordingly provides apparatus for stretching a shoe upper forepart, the apparatus comprising clamps arranged to grip the forepart at a plurality of spaced positions and means operable to effect movement of each clamp to increase the spacing therebetween. The invention also provides a method of stretching a shoe upper forepart, the method having the steps of gripping the forepart at a plurality of spaced positions and moving each of the gripping means so as to increase the spacing therebetween.

In a preferred embodiment of the invention, the means for effecting the movement of the clamps or gripping means is a single cam plate. The clamps can be provided at the ends of a plurality of levers which are pivoted at their other ends for tilting in angularly spaced planes including the axis of the cam plate and which between their ends carry cam followers engaging cam surfaces at the periphery of the cam plate. Three such clamps are used in the apparatus preferred.

It will be evident that such apparatus will not actually preform the vamp, that is, shape it so that it will approximate to the form of the last, as will the apparatus of aforesaid applications Ser. Nos. 362,365 and 430,327, but will merely stretch it in a plane. The apparatus of the present invention can however be adapted for pre-forming by the provision of a mould movable, for example, axially of the cam plate, to stretch the vamp out of the plane of the three clamps. Means for applying heat or heat and moisture to the stretched vamp can be provided. The range of movement of the clamps is desirably great enough to include initial movement to take up slack in the vamp and to adjust for vamps of different sizes. One clamp at least is preferably movable independently of the operation of the cam plate to accomodate vamps of different shapes.

Other objects, features and advantages of the invention will appear from the following description and the accompanying drawings which are given not to imply any limitation of the invention but solely by way of illustration.

In the drawing:

FIGURE 1 is a schematic plan view of the apparatus; and

FIGURE 2 is a partial schematic side view of the apparatus of FIGURE 1.

The apparatus illustrated is intended for pre-forming a vamp or shoe upper forepart 1 having the shape indicated by the chain dotted line of FIGURE 1.

The apparatus has three clamps 2, 3 and 4. As appears from FIGURE 2, each comprises an upright lever 5 with an arm pivoted at its upper end. The lower face of the arm constitutes a clamping surface which co-operates with another clamping surface on the upper end face of the lever 5 for gripping an edge of the vamp between them. The clamping arm extends beyond the top surface of the lever 5, on the side of the pivotal connection remote from the clamping surface, to make a further pivotal connection with an actuating rod, which is longitudinally movable in the direction of the arrow to pivot the arm into the clamping position and in the reverse direction to release the clamping pressure. The clamping surfaces can be roughened, or provided with inter-fitting ridges, to afford a better grip on the vamp.

A cam follower 6 is carried by each lever 5 at a point between its ends for engagement with a respective cam surface formed on the edge of a cam plate 7, which can be rotated about an axis X—X, indicated in FIGURE 2. The three levers 5 are spaced substantially uniformly around the plate 7 and each is pivoted on an axis 10 at its lower end for tilting or rocking movement in a plane including the axis X—X. The three cam surfaces provided on the plate 7 are shaped as appears from FIGURE 1 and it will be noted that rotation of the plate in one direction will cause all the levers 5 to tilt so that the clamps move away from the axis X—X whilst rotation in the opposite direction will cause them all to move inwards towards the axis. Resilient means (not shown) are provided to urge the levers 5 inwardly so that the cam follower 6 always engage the cam surfaces on the plate periphery.

Rotation of the cam plate 7 can be effected by means of a gear wheel 8 secured to the top of the plate co-axially therewith. The gear wheel 8 meshes with a worm gear 9 carried on a drivng shaft 9a which extends at right angles to the axis X—X. Rotation of the plate 7 can thus be effected by rotation of the shaft 9a and also by moving the shaft axially.

The vamp for a small size shoe will of course be smaller than that for a large size of the same style. To adjust the clamps to accommodate a change in size whilst maintaining the vamp correctly centred over the axis of the cam plate, the cam contours controlling the movement of the clamps 3 and 4, which are intended to grip the wings of the vamp, are made the same. The cam surface co-operating with the clamp 2, which is for gripping the toe portion of the vamp, is however arranged to produce a movement of this clamp which is rather smaller than that of the other two.

The illustrated apparatus also includes a platform 11 mounted on a rod extending along the axis of the cam plate 7. Conveniently the plate 7 and the gear wheel 8 are carried by a hollow shaft (not shown) through which this rod projects. The platform 11 is arranged to support a mould, such as the lobed mould described in aforesaid applications Ser. Nos. 362,365 and 430,327, and the rod is axially movable to bring such a mould into engagement with a vamp held by clamps 2, 3 and 4.

In use, the cam plate 7, is rotated to bring the clamps to positions at which they can grip the edges of the unstretched vamp. Rotation of the plate 7 in the anti-clockwise direction, as seen in FIGURE 1 then follows so that the vamp is stretched by the increasing separation of the clamps. It is convenient to use either rotation or axial movement of the shaft 9a for quickly taking up slack in the vamp and possibly for applying an initial tension; the other movement of the shaft can then be used to effect the actual stretching. At an appropriate point is this stretching process, the platform 11 is raised to bring the mould it carries against the underside of the vamp and so deform it upwardly out of the plane of the clamps.

The range of movement of the clamps, 2, 3 and 4 is sufficient to allow different sizes of vamp to be stretched by the desired amount. In addition, the pivot axis 10 of the clamp 2 is made adjustable towards and away from the axis X—X, as indicated by arrows in FIGURE 2, to provide for further adjustment.

As explained in aforesaid applications Ser. Nos. 362,365 and 430,327, retention of the shape to which the vamp is stretched or deformed can be assisted by the application to the vamp of heat or heat and moisture. The apparatus of the present invention can accordingly be provided with means for applying heat and/or moisture to the vamp.

It will be evident that the invention provides an apparatus and a method for stretching and pre-forming a shoe upper forepart which are quick and convenient and very readily adjustable to foreparts of a different size or shape. The shoe upper forepart will normally be of leather but the invention is applicable to foreparts of other materials, for example, plastics or textile fabrics.

The apparatus and method particularly described can of course be modified in various ways within the spirit and scope of the invention as defined by the following claims.

What is claimed is:
1. Apparatus for stretching a shoe upper forepart, the apparatus comprising a plurality of clamping means each adapted to grip the forepart, means mounting the clamping means for gripping the forepart at a plurality of spaced positions, and means operable to effect movement of each clamping means to increase the spacing therebetween comprising a cam plate with a plurality of cam surfaces on its edge, and a cam follower carried by each of the clamping means, the means mounting the clamping means locating each cam follower for cooperation with a respective one of the cam surfaces.

2. Apparatus as claimed in claim 1 having a gear wheel secured co-axially with the cam plate, a worm gear meshing with the gear wheel, and means mounting the worm gear for rotation to rotate the cam plate.

3. Apparatus as claimed in claim 2 having means mounting the worm gear for axial movement for effecting rotation of the cam plate independently of rotation due to rotation of the worm gear.

4. Apparatus as claimed in claim 1 each clamping means comprising a lever, a clamping surface at one end of the lever, a member pivotally mounted on the lever, and a clamping surface on the member co-operable with the clamping surface on the lever, and means mounting the levers providing a fulcrum at the end of each lever remote from the clamping surfaces, the means mounting the levers include means permitting adjustment of the position of the fulcrum of one of the levers to alter the position of the associated clamp independently of the operation of the cam.

5. Apparatus as claimed in claim 1 having a shaft carrying a mould, means mounting the shaft to extend axially of the cam plate, and means for moving the shaft axially to engage the mould with a forepart gripped by the clamps.

6. A method of stretching a shoe upper forepart, the method having the steps of gripping the forepart with a plurality of gripping means at spaced positions and moving each of the gripping means so as to increase the spacing therebetween, the forepart being gripped at its toe portion and at each wing, applying a mould to the stretched forepart to deform it out of the plane of the gripping means, and applying heat and moisture to the stretched forepart.

References Cited

UNITED STATES PATENTS

| | | | |
|---|---|---|---|
| 1,110,323 | 9/1914 | Hamilton | 12—54.2 X |
| 2,160,846 | 6/1939 | Eastman et al. | 12—10.5 |
| 2,391,461 | 12/1945 | Jorgensen | 12—10.5 |

PATRICK D. LAWSON, *Primary Examiner.*